June 7, 1949. W. E. GREEN 2,472,582
FOOD CONTAINER
Filed May 4, 1946
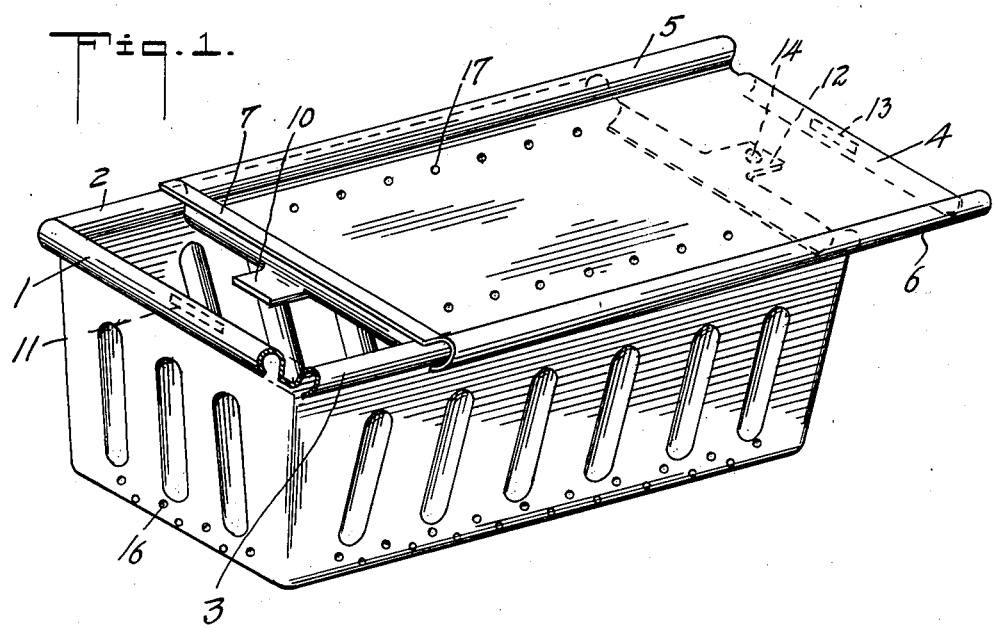
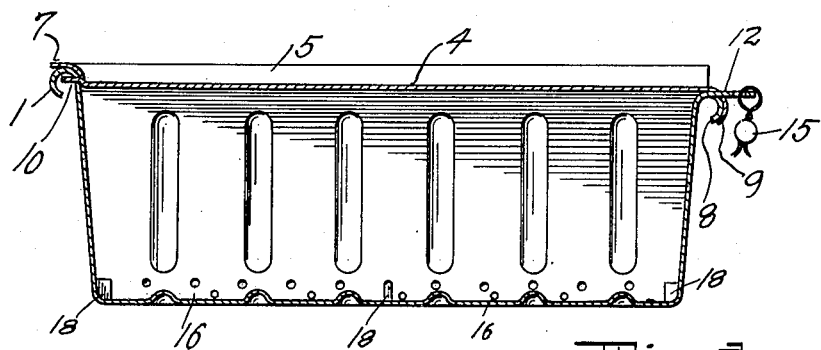
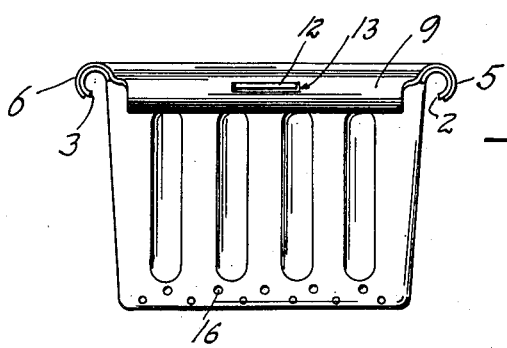
INVENTOR:
W. E. GREEN
BY OO Martin
ATTORNEY.

Patented June 7, 1949

2,472,582

UNITED STATES PATENT OFFICE 2,472,582

FOOD CONTAINER

William E. Green, Los Angeles, Calif.

Application May 4, 1946, Serial No. 667,423

1 Claim. (Cl. 220—41)

The present invention has relation to transportation of foodstuff and refers more particularly to improvements in containers for transporting such material.

In present day practice enormous quantities of perishable foodstuff is transported in refrigerated railroad cars and motor trucks, and such perishable material is ordinarily packed in wooden crates which are stored within such vehicle for transportation. The employment of such wooden crates is objectionable for various reasons, one of which is that upon delivery of the transported goods the crates are discarded and so wasted. Such waste of wood is at the present time, where there is such great need of wood for many purposes, very important, and anything that can be done to eliminate such waste should be of great benefit. Having this condition in view, it is the object of my invention to provide a shipping container for perishable foodstuffs of simple and inexpensive construction and which, upon delivery of its contents, may be readily sterilized and the containers stacked together so as to occupy very little space in order to make it possible and profitable to return the containers for further use.

Another objection to the use of present day wooden containers and crates for storing perishable foodstuff for transportation is that a portion of the contents of the containers is lost in transit; partly on account of the crudeness of the cases or crates and also through pilfering by persons handling the containers in transit. It is the further object of my invention to provide a shipping container of the type above referred to which may be closed tightly and, if desired, even become sealed so as to eliminate all danger of loss during transit of the goods.

Having these and other objects in view, the invention resides in the combinations hereinafter fully described and illustrated in the accompanying drawings, of which:

Fig. 1 is a perspective view of a food container embodying the invention and showing the cover thereof in partly open position;

Fig. 2 is a cross-sectional side elevational view of the closed container taken substantially through the center thereof; and Fig. 3 is a right end view of the device.

As illustrated in the drawings, the container is rectangular in shape and the top edge thereof is, along one end and the two sides thereof, upwardly and outwardly curled to form a tubular rim 1, 2, and 3. The cover 4 is, along the sides thereof, made with tubular rims 5 and 6 which are made so much larger than the rims 2 and 3 that they are longitudinally slidable thereon. It is important to note that all of these rims are slightly tapered toward the right end thereof in order to facilitate movement of the cover onto the rims of the container, and so that when the cover is completely closed, as indicated in Fig. 2, the rims of the cover fit the rims of the container snugly. It is noticed that the rim 7, at the left end of the cover, is made partly uncurled in order to make it possible for this portion of the rim to slide over the rim 1 when the cover is closed, as indicated in Fig. 2. The right ends of the container and of the cover are made with similar interfitting rims 8 and 9, and it is important to note that these rims are placed and extend below the level of the cover in order to make it possible to assemble the cover on the container, as above explained.

Because the interengaging rims are upwardly curled, it is seen that, when the closed containers are stacked on top of each other and set end to end within a freight car or truck, the bottoms of the upper containers will be held in position within the cover flanges of the lower containers.

While the interfitting rims combine to maintain the cover firmly in position on the container, it may be well, in order further to strengthen the structure, to mount a lip 10 so as to project horizontally from the cover rim 7 and to provide a perforation 11 through the inner wall of the rim 1 for admission of the lip 10, as best indicated in Fig. 2. Similarly, a lip 12 is caused to project horizontally from the rim 8 of the container for projection through a perforation 13 in the outer wall of the cover rim 9. When this lip is extended to project a distance beyond the rim of the cover and a perforation 14 is provided through the lip, it is found that in addition to strengthening the structure, as aforesaid, it is also possible to place a seal 15 on the end of this lip in the fashion that freight cars and trucks ordinarily are sealed, or, if preferred, a padlock may be employed for this purpose. Whichever method is used, it is seen that it is possible completely to seal the container so that it is impossible for unauthorized persons to remove any of the contents thereof, or for the cover to become opened in transit.

For the purpose of ventilation where such is required, it is possible to provide in the side walls of the container, at the bottom thereof, and in the cover, a multiplicity of perforations 16, 17, of any size found most suitable for this purpose, and through which, also, accumulations of liquids may escape from the container.

As stated, it is one of the principal objects of my invention to provide a shipping container which may be returned to the shipper at such low cost that it is profitable to use the container over and over again. In order to make this possible, it becomes necessary to make the sides and ends of the container slightly slanting towards the bottom thereof, merely sufficient to make it possible to stack the containers into each other after the covers have been removed therefrom. When so stacked together it is seen that a great number of containers may be stored away in a comparatively very small space. Because the rims of the covers also are tapered towards one end thereof, I have found it possible to telescope the covers together at least the greater portion of the length thereof and so thereby not only to save space but also to make certain that the covers, being tightly fitted together, are not easily dented or otherwise damaged in handling.

The containers should be made from light and strong material such as aluminum, magnesium, or some of the novel compressed paper compounds, in order to reduce the weight thereof as much as possible, but even so it is found that the packed containers, when placed on top of each other, are subject to considerable pressure, and it may for this reason be found advisable to corrugate the sides and ends of the container, substantially as indicated at various points in the drawings; and it may also, where heavy foodstuff such as meat or fish is tightly packed in the container, be necessary to corrugate the bottoms thereof.

When the containers are stacked together for return transportation, as above explained, there is a danger that they may become tightly packed together, and that for this reason it may become necessary to utilize some special tools for prying them apart. This is objectionable, because in doing so there is a danger of distorting the shape of the containers to the extend that it may become difficult again to mount the covers thereon. For this reason I have found it advisable to mount, at or near the bottom of the container, a plurality of projecting buttons or lugs 18, on the top of which the superimposed container will come to rest when the containers are stacked together, as aforesaid, thereby to prevent one container from sticking tightly within another.

While I have in the foregoing described a preferred form of my invention, I wish it understood that I am not limited to the precise shapes and arrangements of parts and features thereof, but reserve the right to embody such modifications as will come within the scope of the claim herein appended.

I claim:

In a device for transporting goods in combination, a rectangular container having the upper side edges thereof and the upper edge of one end thereof upwardly and outwardly folded to form a continuous cylindrical rim, the side portions of the container rims being slightly smaller at the free outer ends thereof, the upper edge at the other end of the container being folded downward below the level of the side rims of the container, a cover having its side edges upwardly and outwardly folded to form similar cylindrical rims of a size freely to engage the side rims of the container from the small free ends thereof and to fit said rims snugly when the cover is fully closed, the forward end of said cover being upwardly folded to form a rim snugly fitting over the end rim of the container when the cover is fully closed, the cover being made with a lip forwardly projecting from said end rim thereof and positioned to enter into the end rim of the container when the cover reaches fully closed position, the other end of the cover being downwardly folded to form a cylindrical rim below the level of the side rims thereof, said rim having an opening therethrough, the other end of the container having a lip rearwardly extending therefrom and positioned to enter and pass through the opening in the cover rim when the cover reaches fully closed position, and means engaging said container lip for locking the cover in closed position on the container.

WILLIAM E. GREEN.

REFERENCES CITED

The following references are of record in the file of this patent:

UNITED STATES PATENTS

| Number | Name | Date |
|---|---|---|
| 676,049 | Reay | June 11, 1901 |
| 831,476 | Ryan | Sept. 18, 1906 |
| 901,302 | Leilich | Oct. 13, 1908 |
| 977,445 | Fugate | Dec. 6, 1910 |
| 1,325,349 | Burgess | Dec. 16, 1919 |
| 1,883,646 | Ellis | Oct. 18, 1932 |
| 1,972,793 | Prendergast | Sept. 4, 1934 |
| 1,997,220 | Killgore | Apr. 9, 1935 |
| 2,102,094 | Romig | Dec. 14, 1937 |
| 2,273,999 | Rueger | Feb. 24, 1942 |
| 2,289,747 | Baker | July 14, 1942 |
| 2,295,747 | Mills | Sept. 15, 1942 |
| 2,310,534 | Markey | Feb. 9, 1943 |